United States Patent
Windrem et al.

(10) Patent No.: US 6,831,704 B1
(45) Date of Patent: Dec. 14, 2004

(54) LINKING EXTERNAL DEVICES TO SWITCHER TRANSITIONS

(75) Inventors: Kevin D. Windrem, Grass Valley, CA (US); Michael Krim, Waltham, MA (US)

(73) Assignee: Grass Valley (U.S.) Inc., Nevada City, CA (US)

( * ) Notice: Subject to any disclaimer, the term of this patent is extended or adjusted under 35 U.S.C. 154(b) by 0 days.

(21) Appl. No.: 09/365,282

(22) Filed: Jul. 30, 1999

(51) Int. Cl.[7] .............................................. H04N 9/74
(52) U.S. Cl. ...................... 348/584; 348/590; 348/594; 348/595; 348/705; 348/460
(58) Field of Search ................................. 348/705, 706, 348/460–473, 474, 552, 553, 559, 571, 575, 722, 725, 584, 590, 825.24, 591, 598, 599, 585, 593–595

(56) References Cited

U.S. PATENT DOCUMENTS

| | | | | |
|---|---|---|---|---|
| 3,944,731 A | * | 3/1976 | Busch | 348/594 |
| 4,218,709 A | * | 8/1980 | Baxter et al. | 348/584 |
| 4,532,547 A | * | 7/1985 | Bennett | 348/518 |
| 4,581,645 A | * | 4/1986 | Beyer, Jr. | 348/705 |
| 4,644,400 A | * | 2/1987 | Kouyama et al. | 348/512 |
| 4,668,999 A | * | 5/1987 | De La Cierva et al. | 386/4 |
| 4,808,992 A | * | 2/1989 | Beyer, Jr. et al. | 348/825.24 |
| 4,855,834 A | * | 8/1989 | Cawley et al. | 348/594 |
| 5,109,280 A | * | 4/1992 | Karlock | 348/705 |
| 5,162,904 A | * | 11/1992 | Beaulier et al. | 348/705 |
| 5,189,563 A | * | 2/1993 | Breslau et al. | 386/53 |
| 5,287,186 A | * | 2/1994 | Takamori | 348/70 |
| 5,396,636 A | * | 3/1995 | Gallagher et al. | 713/323 |
| 5,532,830 A | * | 7/1996 | Schuler | 358/335 |
| 5,563,579 A | * | 10/1996 | Carter | 340/539.17 |
| 5,657,221 A | * | 8/1997 | Warman et al. | 700/83 |
| 5,786,864 A | * | 7/1998 | Yamamoto | 348/473 |
| 5,903,702 A | * | 5/1999 | Sugiyama et al. | 386/52 |
| 5,982,350 A | * | 11/1999 | Hekmatpour et al. | 345/113 |
| 6,023,675 A | * | 2/2000 | Bennett et al. | 704/235 |
| 6,144,798 A | * | 11/2000 | Nagasawa et al. | 386/52 |
| 6,191,814 B1 | * | 2/2001 | Elberbaum | 348/211.14 |
| 6,204,840 B1 | * | 3/2001 | Petelycky et al. | 345/302 |
| 6,259,488 B1 | * | 7/2001 | Trethewey | 348/578 |
| 6,271,829 B1 | * | 8/2001 | Ricotta et al. | 345/156 |
| 6,285,406 B1 | * | 9/2001 | Brusky | 348/552 |
| 6,438,618 B1 | * | 8/2002 | Lortz et al. | 719/318 |
| 6,452,612 B1 | * | 9/2002 | Holtz et al. | 345/723 |
| 6,524,169 B1 | * | 2/2003 | Andersson et al. | 451/49 |
| 6,678,002 B2 | * | 1/2004 | Frink et al. | 348/445 |
| 6,686,970 B1 | * | 2/2004 | Windle | 348/584 |

OTHER PUBLICATIONS

Browne et al, Large capacity, random access, mult–source recorder player, Dec. 23, 1992.*
(WO 92/22983) Browne, Large capacity, random access, multi–source recorder player, Dec. 23, 1992, PCT.*

* cited by examiner

*Primary Examiner*—John Miller
*Assistant Examiner*—Annan Q. Shang
(74) *Attorney, Agent, or Firm*—Joseph S. Tripoli; Harvey D. Fried; Robert B. Levy

(57) ABSTRACT

An improved video production architecture adds an additional transition element for controlling external devices in synchronism with a given transition so that the transition is treated like a simple mix or wipe. The additional transition element is a "Trigger" function that has a value indicating when during the given transition the external device is activated. The trigger function, device controlled and trigger value are set up during preconfiguration of an effect in an effects memory. When the effect is recalled, if the Trigger function is activated on a switcher control panel, then the external device is activated at the time during the given transition specified by the trigger value.

8 Claims, 2 Drawing Sheets

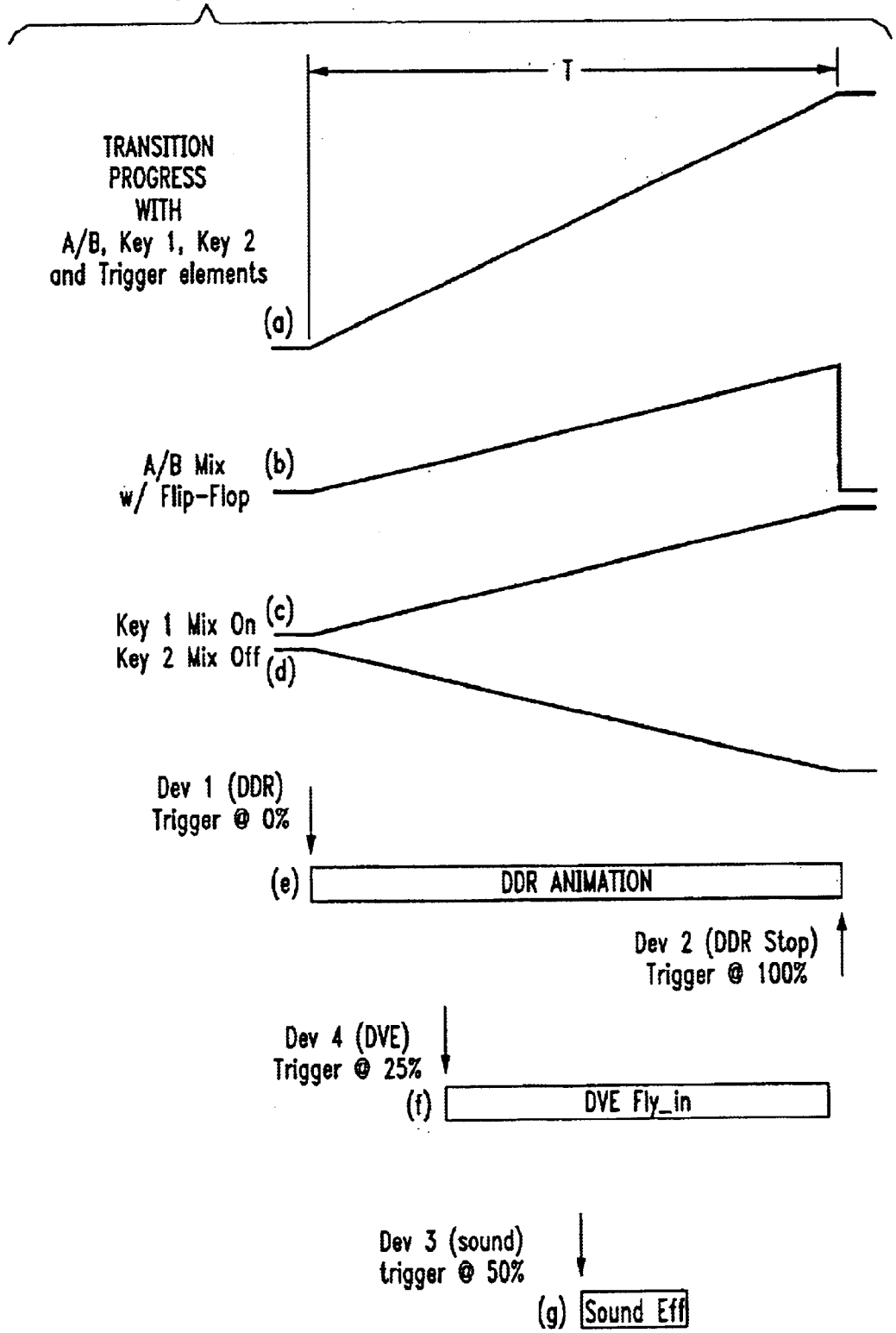

LINKING EXTERNAL DEVICES TO SWITCHER TRANSITIONS

BACKGROUND OF THE INVENTION

The present invention relates to video signal processing, and more particularly to linking external devices to switcher transitions so that an operator may treat transitions which include sound effects or animations in the same way as a simple mix or wipe.

Video production switchers have become the center of a live production system, not only for video but also for device control. Modern effects involve many devices that have to be driven in synchronism. Such modern effects may involve sound effects or playback of short animations synchronized with a switcher mix, wipe or digital effect fly-in. Presently production switchers provide this capability through an effects memory system. However it is difficult to manage such effects for real world situations. Effects programmed to involve a background video signal and a key signal, for example, would have to be rebuilt in order to apply only to the background video signal. Operators focus on the switcher's transition system for making changes in the program content, but must change their thinking process when the transition involves external devices, such as sound effects, animations or digital effects fly-in.

What is desired is the ability to link external devices to a production switcher so that the operator may treat transitions that include sound effects, animations or digital effects fly-ins in the same way as a simple mix or wipe.

BRIEF SUMMARY OF THE INVENTION

Accordingly the present invention provides a method of linking external devices to a video production switcher so that transitions that involve sound effects, animations or digital effects fly-ins may be treated as simple mixes or wipes. A "Trigger" function is added as a transition element. During preconfiguration of an effect in an effects memory, the trigger is set, the external device indicated and a trigger value established. When the effect is recalled for activation and a trigger enable control is activated at a transition control panel, the external device is activated during the transition at a point determined by the trigger value.

The objects, advantages and other novel features of the present invention are apparent from the following detailed description when read in conjunction with the appended claims and attached drawing.

BRIEF DESCRIPTION OF THE SEVERAL VIEWS OF THE DRAWING

FIG. 3 is an illustrative view of the waveforms and actions associated with linking external devices to switcher transitions according to the present invention.

DETAILED DESCRIPTION OF THE INVENTION

Figure 1:
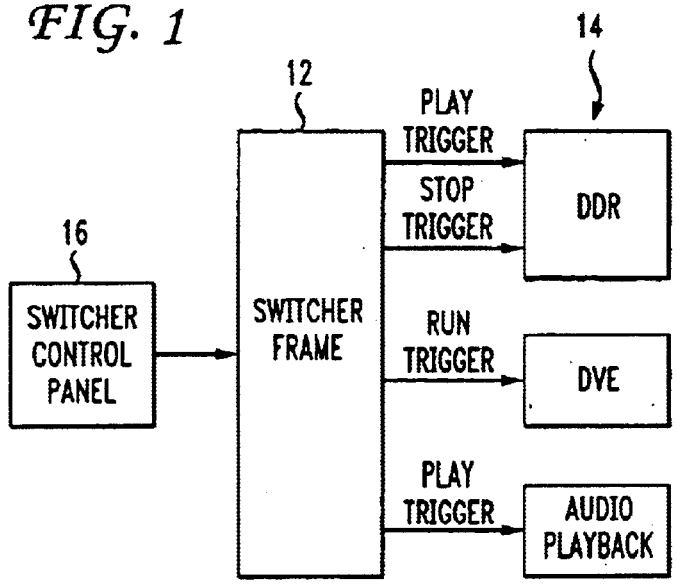
FIG. 1 is a block diagram view of a switcher system for linking external devices to switcher transitions according to the present invention.

Referring now to FIG. 1 a switcher system is shown having a switcher frame 12 that processes video signals and generates trigger control signals for a plurality of external devices 14, such as a digital disk recorder (DDR), a digital video effects (DVE) device, an audio playback device and the like. An operator enters control commands for the switcher frame 12 via a switcher control panel 16.

Figure 2:
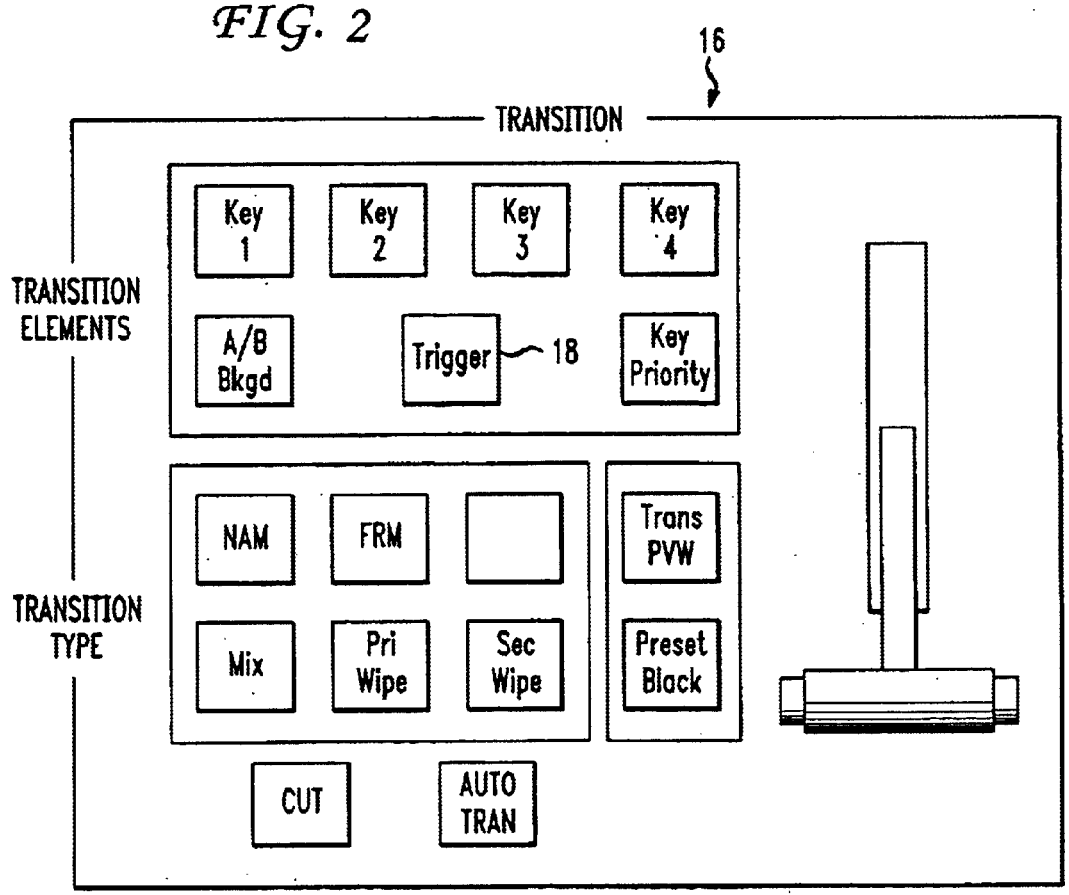
FIG. 2 is a plan view of a transition control panel for a switcher that links external devices to switcher transitions according to the present invention.

Current multilevel transition systems build transitions from a set of elements—Key 1, Key 2, . . . A/B Background and possibly others. In order to control external devices 14 so that transitions that include such external devices, such as sound effects, animation or digital effects fly-ins, are treated like mixes or wipes, an additional trigger element, which controls the external devices 14, is provided and the switcher control panel 16 includes a trigger enable control 18 as shown in FIG. 2. This permits the operator to quickly decide whether a transition includes sound effects, for example, or runs without them, much like deciding whether a transition adds or removes Key 1 or leaves it alone.

As shown in FIG. 3 a transition occurs as a ramp between two signals, with one signal gradually changing to the other signal during a time interval T. The transition may end with the second signal on the screen, or at the end of time T the signals may flip-flop so that the first signal is returned to the screen at the end of the transition, such as when the preview and program buses are switched at the end of the transition. The next two timelines show the key signal transitions when transitioning from keyer 1 to keyer 2 outputs. When a transition is performed with the trigger enable control activated, thus enabling the trigger control element, one or more of the external devices is activated on the timeline T in sync with the progress of the transition, such as when the trigger value is set to 0%, or triggered at a user-defined point in the transition depending upon the trigger level set. What the external device does in response to this stimulus is determined by the external device. This may be to jog or trigger playback of a video and/or audio clip.

As shown at the bottom of FIG. 3, a transition effect may be preconfigured to have a trigger element with a trigger value of 0% to start a DDR playback and a trigger value of 100% to stop the DDR playback. In this event when the transition is activated, either automatically or manually from the control panel, if the trigger enable control 18 is activated the DDR output will play during the transition interval T. Another example is where the trigger value is set at 25% for a DVE, which results in the DVE effect occurring 25% into the transition interval. Finally, an audio example is presented where the trigger value is set at 50% so that the sound effect from the audio playback occurs at the midpoint of the transition interval.

The trigger element is set and values defined together with the associated external device during preconfiguration when the various effects are stored in the effects memory for a particular mix/effects bank. The values may be anything between 0% and 100%. The trigger values are loaded into an effects register when an effect is recalled which has a trigger element preconfigured as part of the effect. The transition effect may then be activated, either manually via a lever arm or automatically. The external device is not activated unless the trigger enable control 18 on the control panel 16 has been activated. This allows preview of an effect without the external device 14. However when played to air the trigger enable control 18 is activated to play the full effect. Each trigger element, depending upon the external device 14, could be one of the following: a GPI (general purpose relay interface) closure; a peripheral bus serial interface command; a VTR or DVE serial protocol command; a musical instrument digital interface (MIDI) command; or a facility manager command.

Thus the present invention provides a method of linking external devices to video production switcher transitions using an additional trigger transition element for controlling such external devices so that transitions that include sound effects, animations or digital effects fly-ins are treated as simple mixes or wipes.

What is claimed is:

1. An improved video production architecture of the type having transition effects that cause a gradual change between signals wherein the improvement comprises a trigger enable control for controlling external devices in synchronism with a given transition, the trigger enable control having a value indicating when during the given transition the external device is activated.

2. A video production architecture according to claim 1, wherein the external device is an audio playback device, a video playback device or a digital effects device.

3. A video production switcher comprising:

a means for executing a transition effect to cause a gradual change between signals over a transition interval, an external device that can be activated to supplement the transition effect, and a trigger enable control that is selectively operable prior to the transition interval for enabling the external device, and wherein the trigger enable control has a first value associated therewith for indicating when during the transition interval the external device, if enabled, is activated.

4. The video production switcher according to claim 3, wherein the trigger enable control further has a second value associated therewith for indicating when during the transition interval the external device is deactivated.

5. A video production switcher according to claim 3, wherein the external device is an audio playback device, a video playback device or a digital video effects device.

6. A method of operating a video production switcher, said method comprising:

specifying a first value associated with a trigger enable control, enabling an external device, and executing a transition effect to cause a gradual change between signals over a transition interval, and wherein execution of the transition effect results in activation of the enabled external device at a time during the transition interval that depends on said first value.

7. The method according to claim 6, further comprising specifying a second value associated with the transition effect, and wherein execution of the transition effect results in deactivation of the external device at a time during the transition interval that depends on said second value.

8. A method according to claim 6 wherein the step of enabling an external device comprises enabling an audio playback device, a video playback device or a digital video effects device.

* * * * *